A. HAGER & Y. ALLYN.

BAGASSE FURNACE.

No. 549. Reissued May 4, 1858.

THE NORRIS PETERS CO., PHOTO-LITHO., WASHINGTON, D. C.

UNITED STATES PATENT OFFICE.

ABRAHAM HAGER, OF BATON ROUGE, AND YOUNGS ALLYN, OF NEW ORLEANS, LOUISIANA.

IMPROVEMENT IN BAGASSE-FURNACES.

Specification forming part of Letters Patent No. 14,812, dated May 6, 1856; Reissue No. 549, dated May 4, 1858.

*To all whom it may concern:*

Be it known that we, ABRAHAM HAGER, of Baton Rouge, in the parish of East Baton Rouge, and YOUNGS ALLYN, of the city of New Orleans, in the parish of Orleans and State of Louisiana, have invented a new and useful Improvement in Bagasse-Furnaces; and we do hereby declare that the following is a full, clear, and exact description of the construction and operation of the same, reference being had to the annexed drawings, forming part of this specification, in which—

Figure 1:
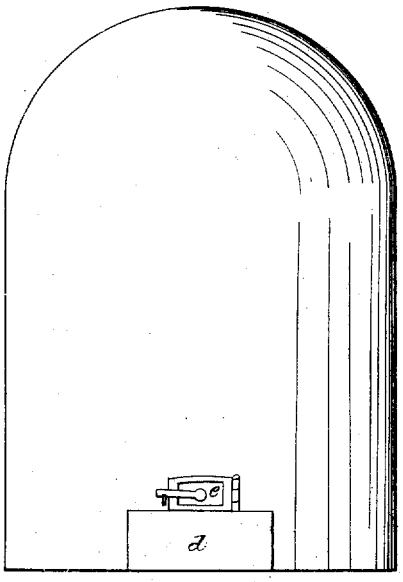
Figure 2:
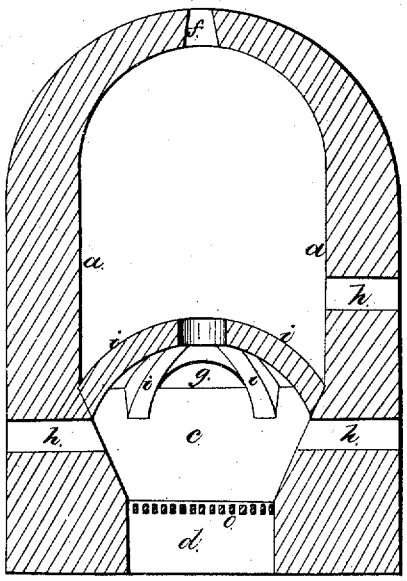
Figure 4:
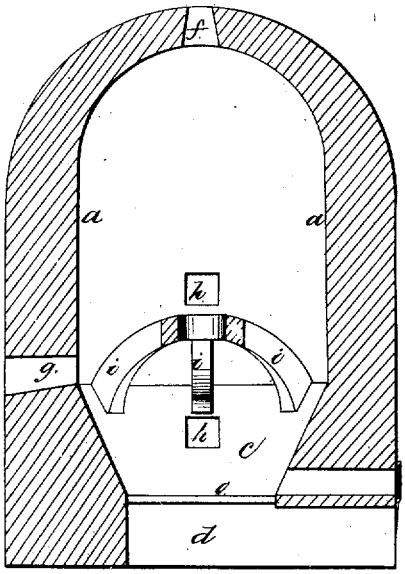
Figure 3:
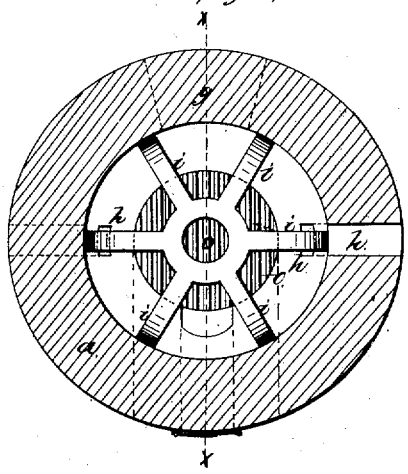

Figure 1 is a side elevation of an ordinary cylindrical bagasse-furnace. Fig. 2 is a vertical section of same, taken through axis and perpendicular to grate-bars. Fig. 3 is a horizontal section of the furnace. Fig. 4 is a vertical section on *x x*.

Similar characters of reference in the several figures denote the same parts.

The character of furnace to which our invention is applicable is that where the upper portion is dome-shaped, with an opening at the crown to receive the wet bagasse as it comes from the mill. The falling of this wet mass directly upon the fire has been found to be exceedingly detrimental to the successful operation of this class of furnaces. It is to obviate this disadvantage that our invention is designed.

The nature of the invention consists in the construction in the body of the furnace, and rising above the exit flue of the products of combustion, of a skeleton dome, for the purpose of receiving and retaining the wet bagasse until it is partially dried by the fire below, and has become better adapted to support combustion than it was when it entered the furnace, when it will fall upon the fire and be consumed.

In the drawings, *a a* represent the masonry of the furnace. *f* is the opening through which the bagasse is admitted from the mill. *c* is the lower portion of the furnace, in which combustion takes place. It has grate-bars *o*, on which the fire is made, and an ordinary ash-pit, *d*, below. It also has a door, *e*, to admit the supply of dry fuel in starting or replenishing the fire, if necessary. At a suitable distance above the grate *o* is the exit-flue *g* for the products of combustion, which leads under the boilers requiring the heat. Rising above the exit-flue *g* is the skeleton dome, composed of ribs *i i i*, extending from the sides of the furnace to a central ring, as shown in Fig. 3. The ribs *i* are so placed on each side of the exit-flue *g* as to leave an open space in front of said flue for the purpose of preventing the overhanging mass of bagasse from obstructing the mouth of the flue. By this construction the draft of the furnace is not affected by the bagasse held up by the dome. This dome receives the wet bagasse as it falls into the furnace, and permits it to be dried to a certain extent by the fire below before it falls from the dome into the burning mass and is itself consumed. There are stirring openings *h h* through the sides of the furnace both above and below the dome, the upper being used in case the bagasse should choke above the dome, and the lower opening employed for the ordinary stirring required in the combustion-chamber.

The operation of the furnace is similar to others of like character—a continuous feed being supplied at *f*, while the fire, after being started with dry fuel is maintained by partially-dried bagasse falling through the skeleton dome.

We make no claim to the insertion in bagasse-furnaces of a grate inclining from the front of the furnace to a position under the exit-flue for the products of combustion, as the operation of such grate will be different from what is designed to be effected by our construction; but What we do claim as new and of our own invention, and desire to secure by Letters Patent, is—

Inserting in the furnace a skeleton dome rising above the exit-flue, so as to arrest the fall of the wet bagasse, and for a limited time retain it above the fire without obstruction to the draft of the furnace, substantially as hereinbefore set forth.

ABRAHAM HAGER.
YOUNGS ALLYN.

In presence of
FRANCIS ARMSTRONG,
STEPHEN ALLEN.